US010299005B1

(12) United States Patent
Killick et al.

(10) Patent No.: US 10,299,005 B1
(45) Date of Patent: May 21, 2019

(54) ON DEMAND LINEAR PROGRAMMING

(71) Applicant: Cox Communications, Inc., Atlanta, GA (US)

(72) Inventors: Ray Killick, Alpharetta, GA (US); Muhammad Asif Raza, McDonough, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/184,733

(22) Filed: Jun. 16, 2016

(51) Int. Cl.

| H04N 21/482 | (2011.01) |
|---|---|
| H04L 29/06 | (2006.01) |
| H04N 7/173 | (2011.01) |
| H04N 7/22 | (2006.01) |
| H04N 21/61 | (2011.01) |
| H04H 20/69 | (2008.01) |
| H04N 21/2668 | (2011.01) |
| H04N 21/2347 | (2011.01) |
| H04N 21/4405 | (2011.01) |
| H04N 21/4623 | (2011.01) |
| H04N 21/266 | (2011.01) |
| H04N 21/6334 | (2011.01) |
| H04N 21/845 | (2011.01) |
| H04N 21/472 | (2011.01) |
| H04N 21/25 | (2011.01) |

(52) U.S. Cl.
CPC .......... *H04N 21/482* (2013.01); *H04H 20/69* (2013.01); *H04L 29/06462* (2013.01); *H04N 7/17318* (2013.01); *H04N 7/22* (2013.01); *H04N 21/2347* (2013.01); *H04N 21/251* (2013.01); *H04N 21/2668* (2013.01); *H04N 21/26613* (2013.01); *H04N 21/4405* (2013.01); *H04N 21/4623* (2013.01); *H04N 21/47202* (2013.01); *H04N 21/6118* (2013.01); *H04N 21/63345* (2013.01); *H04N 21/8456* (2013.01)

(58) Field of Classification Search
CPC ......... H04N 21/4828; H04N 21/23439; H04N 21/482; H04N 7/173; H04N 7/22; H04N 21/2347; H04N 21/251; H04N 21/26613; H04N 21/2668; H04N 21/4405; H04N 21/4623; H04N 21/47202; H04N 21/6118; H04N 21/63345; H04N 21/8456; H04H 20/69; H04L 29/06462
See application file for complete search history.

(56) References Cited

U.S. PATENT DOCUMENTS

2008/0270446 A1* 10/2008 Gossweiler ....... G06F 17/30867
2011/0078757 A1* 3/2011 Poli .................... H04N 21/2541
725/120

* cited by examiner

*Primary Examiner* — Hunter B Lonsberry
(74) *Attorney, Agent, or Firm* — Merchant & Gould

(57) ABSTRACT

Linear content holds great value to consumers, and by delivering it to consumers on demand, service providers can improve the user experience for their consumers. A consumer requests linear on demand content by selecting channels and time ranges or content items, or bundles thereof, which the service provider broadcasts as linear content. The requested content is broadcast, and repackaged as an unbroken block of content for the consumer during the requested time range or the duration of the content item. By repackaging the linear on demand content, the service provider may provide greater options to consumers without significantly increasing the amount of bandwidth used in its network to deliver that content. Channel guides and viewing features are tailored for the requested content to further improve the user experience.

20 Claims, 7 Drawing Sheets

ON DEMAND LINEAR PROGRAMMING

BACKGROUND

Programs that are delivered via the Internet are often highly compressed video on demand (VOD) content that are encoded to be displayed via a general-purpose computer rather than a set top box. Several methods have been developed to improve the use of the Internet as a viable conduit for delivering VOD content, including buffering, locally caching, and changing the content profile of the content (e.g., aspect ratio, resolution, bit rate) to address changing network conditions.

Prior cable television service networks provided consumers with limited access to on demand broadcast programs in the form of pay-per-view (PPV) programming. PPV programming, however, is transmitted via a separate channel over a cable television service network, and as more PPV channels are added, available bandwidth over the cable television service network is reduced accordingly. Moreover, because PPV is provided on a separate channel, program guides and channel assignments reflect its programming apart from standard channels and their programming, reducing the consumer's ability to easily navigate to and from the PPV programming.

SUMMARY

Aspects of the present disclosure provide for systems and methods to provide consumers with access to broadcast content on demand via a hybrid fiber-coaxial (HFC) network and a Content Delivery Network (CDN). HFC networks and CDNs are used to deliver various services to consumers, including cable television services, Internet services, and telephone services. To provide consumers with on demand access to broadcasts of linear content, the service provider allows consumers to request the various content items (or channels and time periods) in which they are interested. The service provider then unlocks access to those channels for the consumer for the duration of the content request. The unlocked channels are provided in an unbroken block, such that no "blacked out" channels are provisioned between the unlocked channels, and the block is a contained set, which the requesting consumer may freely navigate. Additionally, the program guide data are tailored to match the block's channels.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

As briefly described above, aspects of the present disclosure provide for systems and methods to provide consumers with access to broadcast content on demand via a hybrid fiber-coaxial (HFC) network and a Content Delivery Network (CDN). HFC networks and CDNs are used to deliver various services to consumers, including cable television services, Internet services, and telephone services. To provide consumers with on demand access to broadcasts of content, the service provider allows consumers to request the various content items (or channels and time periods) in which they are interested. The service provider then unlocks access to those channels for the consumer for the duration of the content request. The unlocked channels are provided in an unbroken block, such that no "blacked out" channels are provisioned between the unlocked channels, and the block is a contained set, which the requesting consumer may freely navigate. Additionally, the program guide data are tailored to match the block's channels.

By providing consumers with a block of channels, consumers are provided with an enhanced viewing experience for the content carried by those channels. The ease of navigation (e.g., shorter distances between channels, fewer irrelevant channels, less guide data related to irrelevant channels) and the quality of the programming (e.g., less frequent buffering, smaller cache sizes, higher resolution) may thereby be improved for the consumer. Additionally, service providers may more effectively allocate channels and bandwidth for provisioning on demand broadcast programming.

Figure 1:
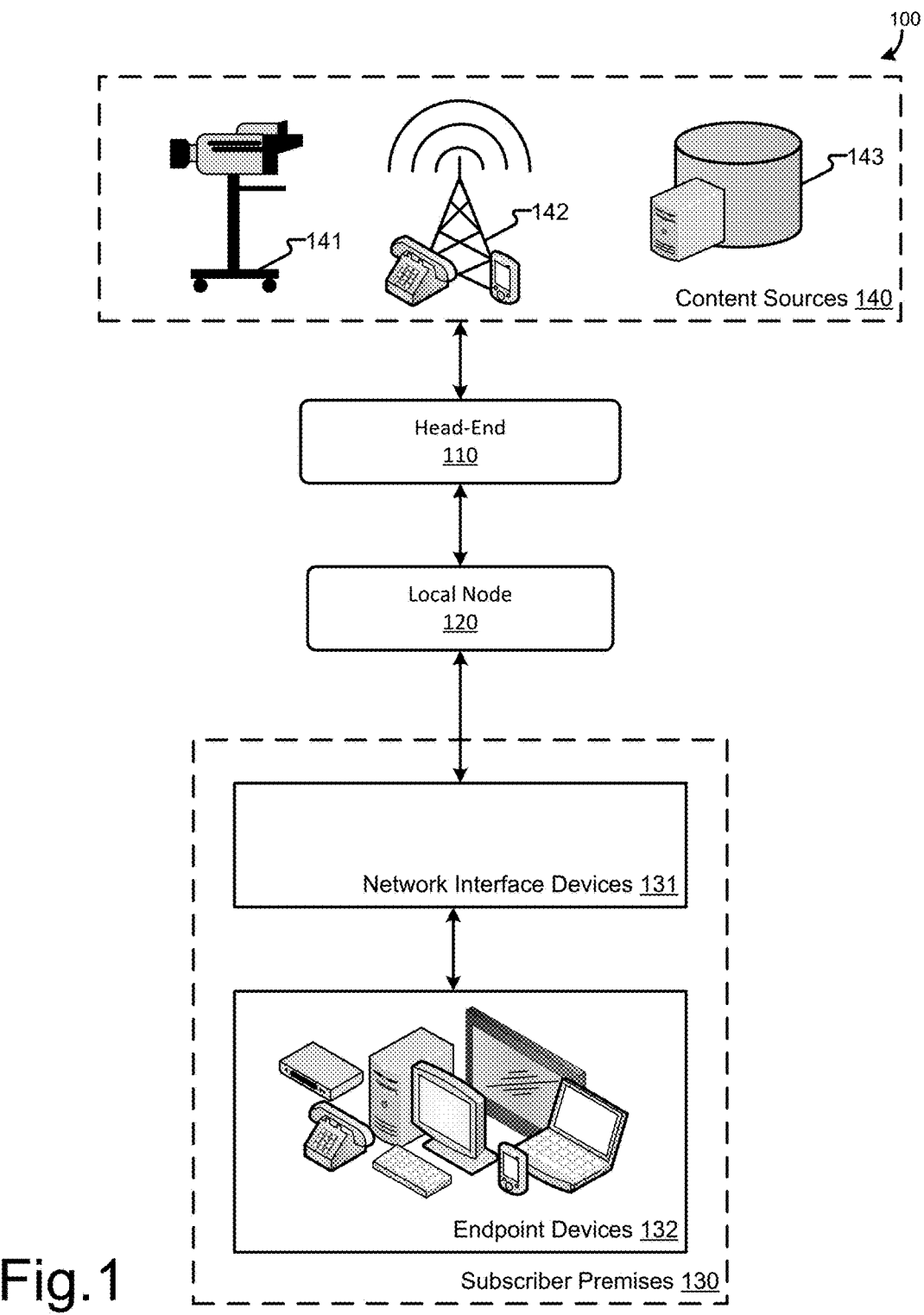
FIG. 1 illustrates an example Content Delivery Network with which the present disclosure may be practiced.

FIG. 1 illustrates an example Content Delivery Network (CDN) 100 with which the present disclosure may be practiced. Services originate at a head-end 110, which distributes services to local nodes 120, which in turn serve subscriber premises 130. The CDN 100 provides tiers of caching and processing from which data are requested and transmitted over a physical network (which may include wired and wireless components), enabling the distribution of data and services for quick access by consumers at lower levels of the tier from higher levels of the tier where the content originates. Content may remain cached at a given tier in the CDN 100 according to a Time to Live (TTL) value associated with the content and/or the tier (e.g., 6, 12, 24 hours), such that the content will expire according to the TTL value so that the CDN 100 may reclaim the memory used to cache the expired content item to cache a different content item. Services include, but are not limited to cable television service, Internet service, and telephone service, and one consumer may be provided with one or more services by the service provider over the CDN 100.

The CDN 100 illustrated in FIG. 1 in various aspects uses an HFC network as its physical network to link subscriber premises 130 with content sources 140 to provide content.

The head-end 110 is in communication with the local node 120 via fiber optic cables, and the local node 120 is in communication with the subscriber premises 130 via fiber optic cables (when fiber to the premises (FTTP) is installed), coaxial cables, or telephone lines. Because subscriber premises 130 are typically wired with coaxial cable, even an FTTP network may be considered an HFC network.

In other aspects, the head-end 110 may be in communication with the content sources via various transmission media, including, but not limited to, fiber optic cables, coaxial cables, telephone lines, and radio waves. Content sources 140 include television stations 141, telephone networks 142, and content servers 143. Television stations 141 include local broadcast stations, cable network stations, and satellite network stations. Telephone networks 142 include wireless networks, such as mobile phone cells in a cellular telephone network, as well as wired networks, such the trunk lines between cell towers and/or telephone exchanges. Content servers 143 include local content servers, such as the servers used by the service provider to store and provide VOD content, and remote content servers, such as those provided via the Internet or by other service providers.

Although, for purposes of simplicity, only one local node 120 and one subscriber premises 130 are illustrated in FIG. 1, one of ordinary skill in the art will understand that a head-end 110 may be in communication with multiple local nodes 120 and each local node 120 may be in communication with multiple subscriber premises 130. One of ordinary skill in the art will also recognize that a head-end 110 may be implemented in a single office or facility, or in a ring of multiple offices or facilities that act as distributed hubs of the head-end 110, which may be in communication with each other via fiber optic cables or radio waves, such as, for example, microwave transmissions.

At the subscriber premises 130, services are received from the local node 120 by network interface devices 131, such as, for example, cable modems, set top boxes (STB), cable cards, and Voice over Internet Protocol (VoIP) telephone interfaces. A network interface device 131 interfaces between the local node 120 and endpoint devices 132, and may convert signals comprising the services from one transmission medium to another transmission medium (e.g., between coaxial cable, Ethernet cable (category-6, category-6e, etc.), telephone cable (RJ11, RJ14, etc.), and radio waves), translate signals between encapsulation modes (e.g., shift signals to heterodynes, change signal standards, change modulation schemes), cache or buffer data for burst transmission, apply forward error correction, and route signals to the appropriate endpoint devices 132.

Endpoint devices 132 are devices used by consumers to consume content delivered over the CDN 100, such as, for example, televisions, Digital Video Recorders (DVR), computers (including desktops, laptops, tablets, netbooks, personal media servers, video game systems, etc.), landline phones (including VoIP and Plain Old Telephone Service (POTS) consoles), mobile phones, fax machines, networked printers, Internet radios receivers, etc. In various aspects, endpoint devices 132 may incorporate interface devices 131, such as, for example, a combination STB and DVR.

As one of ordinary skill in the art will understand, the CDN 100 will include various computer devices, which are used to manage and control how content is cached for the provision of services to consumers. For example, when a consumer requests a content item, the CDN 100 will check for the content item in the cache of the node lowest in the tier (and closest to the consumer) and will check progressively higher in the tiers (up to an origin content store) for a cached version of that content item until it is retrieved and distributed through the tiers of the CDN 100 and the consumer. Computers used in the CDN 100 include processors and memory storage devices, which store instructions that when executed by the processors enable the caching and retrieval of content for the provision of services. Memory storage devices are articles of manufacture that include computer-readable storage media. The term computer-readable storage media does not include transmission media, but refers to hardware media used to store desired information for access by a computer. Examples of computer-readable storage media include, but are not limited to, RAM, ROM, EPROM, EEPROM, solid-state memory, such as flash memory, optical storage, such as CD-ROMs and DVDs, and magnetic storage devices, such as magnetic tape and magnetic disks.

Figure 2:
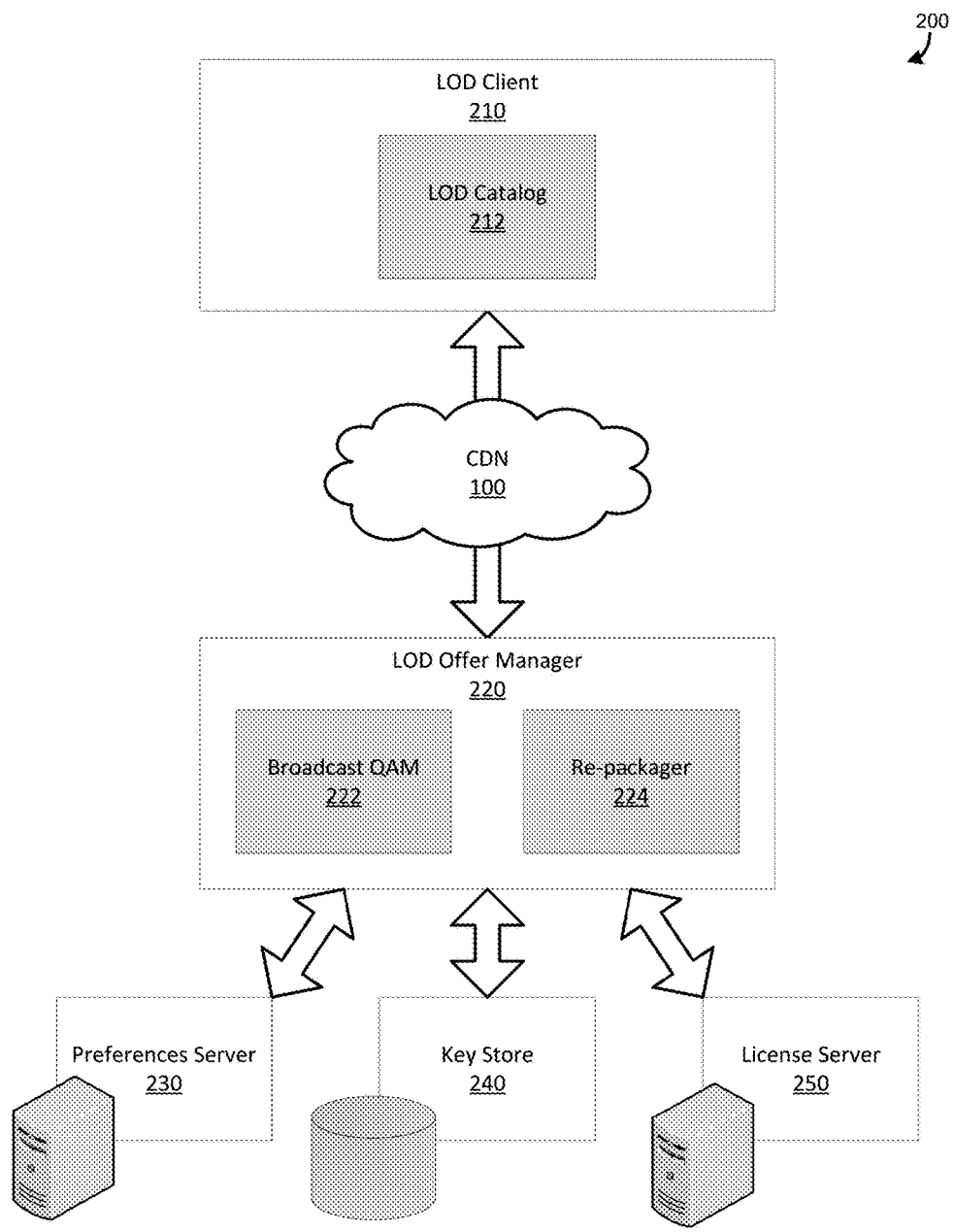
FIG. 2 illustrates an example block diagram of a Linear On Demand (LOD) system.

FIG. 2 illustrates an example block diagram of a Linear On Demand (LOD) system 200. LOD content is delivered via a CDN 100, such as that illustrated in FIG. 1, to an LOD client 210. The LOD client 210 is operable to receive LOD content and make requests for access to LOD content. The requests are handled via the CDN 100 by an LOD offer manager 220, which accesses preferences servers 230, key stores 240, and license servers 250 to provide consumers with access to requested content. The LOD system 200 thus is operable to provide a consumer with access to linear content, on demand, as a continuously navigable block of channels (or as a single stream of content), without an additional outlay of bandwidth from the service provider.

The delivery of LOD content differs from the delivery of standard linear content and VOD content in several ways. Linear content is typically broadcast within distinct, designated channels. Whether the linear content is transmitted over-the-air, via an HFC or via CDN, the content is streamed from the source according a schedule set by the broadcaster. Although DVRs and Video Cassette Recorders (VCR) have allowed linear content to be cached for later playback, the delivery of that content remains linear; the consumer does not choose when the delivery of content from a content source 140 begins or ends. The delivery of VOD, however, is non-linear, as the consumer may select which content is delivered and at what time it is delivered. Not all content, however, is permitted by its rights holders for delivery as VOD, and storing the content requires significant outlays of storage media resources by consumers or service providers.

Although the delivery of LOD content is still linear, the content is not limited to a designated channel. Unlike PPV content delivery, in which a consumer requests access to the distinct, designated channel carrying the PPV content item (which may be separated from other available channels of content) for the duration of the content item, delivery of LOD content shifts the content to a continuous block of channels. In various aspects, this may result in the consumer receiving a personalized stream of LOD content over a single channel or an improved viewing experience over several, easily navigable channels. Further detail of a block of channels is provided in FIGS. 3A and 3B.

The LOD client 210 enables a consumer to request and receive LOD content. In various aspects, the LOD client 210 is provided as a software application running on a network interface device 131, such as, for example, an STB, or on an endpoint device 132, such as, for example, a computer.

The LOD client 210 includes an LOD catalog 212 that indicates what LOD content is available to a given consumer to select as an LOD content item. In various aspects, the LOD catalog 212 provides a listing of available LOD content and content bundles that is stored on a memory storage device associated with the LOD client 210. The listing may include currently available and future available time periods, channels, and content item, as well as the prices, previews, and metadata associated with those time periods, channels, and content items. The LOD catalog 212 enables the consumer to select a time period and channel or a content item to receive, and to authorize the payment to fulfill such a request. The service provider may vary which content and/or channels/times are available to a given consumer based on the consumer's geographical location, current subscriptions, number of concurrent requests for LOD content, and device identifiers. For example, a first consumer in a first region may be limited by the service provider to no more than eight concurrent LOD channel requests, whereas a second consumer in a second geographic region may be limited to sixteen concurrent LOD channel requests. Similarly, a consumer may disable a first device, such as, for example, an STB in a child's bedroom, from requesting and receiving LOD content while leaving a second device, such as, for example, an STB in a family room, operable to access the LOD catalog 212 and request and receive LOD content.

The service provider may periodically update the listings in the LOD catalog 212 to include new programming and to remove expired programming. When new programming is scheduled, which may be several days in advance of its broadcast time, the service provider may add it to the LOD catalog 212. The service provider need not add newly scheduled programming immediately to the LOD catalog 212, nor does every content item or channel need to be made available. For example, the service provider may not make a premium channel available for LOD delivery, may decline to make sporting events available as LOD content in an area affected by a broadcast blackout, or may not make certain timeslots available as LOD content (e.g., only some timeslots are made available). Similarly, a service provider may add content to the LOD catalog 212 even when all of the details are not known, such as, for example, a potential game seven of the Stanley Cup Finals may be scheduled before the need for a seventh game is known or which teams will make it to the finals are known. The service provider may also bundle related content items or channels/times together in the LOD catalog 212. For example, the service provider may offer a Stanley Cup package in the LOD catalog 212 that bundles several channels that carry each of the games of the National Hockey League's playoff series and pre- and post-game shows over the course of several days. Similar packages may be created by the service provider to cover other bundles of times and channels to cover other related programs, and consumers may also create their own bundles by selecting different content items or channels/times. Further details regarding bundles are provided in FIGS. 3A and 3B.

Depending on the length of time that programming is cached by the service provider, a content item may remain in the LOD catalog 212 (i.e., not expire) for a period of time after it has been broadcast. For example, if a consumer were to request a content item of a live football game at halftime, the service provider could provide the consumer with the first half of the game if it is cached by the service provider. Similarly, if the service provider has a policy to cache programming for up to an hour after broadcast, the consumer could request the game up to an hour after the game concludes, but the game's listing would expire and it would be removed from the LOD catalog 212 after the one hour set by policy, so that consumers could not request it more than an hour after the games concludes. As will be understood, the service provider may set various policies based on the channel, the content type (e.g., sports, news, movie, television show), the content owner, the length of the content item, the next occurrence of the content item, etc. For example, a first sitcom may be cached for up to a week after it is broadcast (e.g., when the next episode airs), but a second sitcom may be cached for only an hour after its broadcast concludes.

The LOD Offer Manager 220 is in communication with the LOD client 210 via the CDN 100. The LOD Offer Manager 220 manages updates to the LOD catalog 212 and how LOD content is pushed to the LOD client 210. In various aspects, the LOD Offer Manager 220 is implemented as a server or a software application on a server within the service provider's office, such as, for example, at a facility hosting a head-end 110. When the LOD offer manager 220 is collocated with the transmission facilities of a physical network, it may control the broadcast hardware (e.g., laser diodes) of the transmission facilities to multiplex carriers onto which LOD content has been encoded onto the physical network via a broadcast Quadrature Amplitude Modulator (QAM) 222. The LOD Offer Manager 220 is also in communication with preferences servers 230, key stores 240, and license servers 250 to authorize the consumer to receive the requested LOD content. The content received from content sources 140 for delivery as LOD content is repackaged by a re-packager 224, using data received from the preferences servers 230, key stores 240, and license servers 250.

Preferences servers 230 provide the LOD offer manager 220 consumers' preferences for the delivery of LOD content. The preferences may include a preferred order of LOD channels, the linear channels (if any) the consumer already has access to, billing information, content restrictions, order and viewing histories, and the capabilities of selected network interface device 131 (e.g., number of tuners in an STB, cable modem speed cap) and endpoint devices 132 (e.g., a television refresh rate, an iPad screen resolution).

Key stores 240 provide the LOD offer manager 220 with cryptographic keys for cryptographically scrambling and descrambling (i.e., encrypting and decrypting) LOD content items. Because content is broadcast over a transmission medium that is shared by multiple consumers, the service provider scrambles content so that only consumers who are authorized have access to the content. Keys may be sent periodically to network interface devices 131 or endpoint devices 132 to update which keys are used to descramble content. Periodically changing which keys provides the service provider with greater security for its content and greater control over when consumers are granted access to content. For example, a service provider may update its keys every half hour, or more frequently, to control access to individual content items and to reduce the value of cracking the keys by which content items are scrambled.

License servers 250 enable the LOD offer manager 220 to grant the consumer a license to access the requested LOD content. In various aspects, the license servers 250 is in communication with various rights holders for the LOD content to set the terms of licenses. For example, a rights holder may set as a term for a license for a given LOD content item that it will be cached for a given period of time by the service provider (e.g., one hour or less, up to a week) or whether a content item may be licensed alone or only as part of a time window for a channel (i.e., can the consumer request the content item or must the consumer request the channel carrying the content item for a given period of time to receive the content item). The terms may also include a price for granting a license to a consumer. When a license is granted, an access token is generated, which may be stored by the service provider or the consumer, so that when the licensed content is broadcast, the consumer will be granted access to view the content. In various aspects, access is granted to the consumer by providing the consumer with the keys for descrambling the content for when it is to be aired and/or by encapsulating the content into Internet Protocol (IP) packets in a stream for the consumer's consumption of the content when it airs.

LOD content is encoded for transmission to consumers on the physical network by the broadcast QAM 222 and will be encrypted by an encryptor to ensure that those transmissions are secure. As will be appreciated, content cached in the CDN 100 for transmission over the physical network may be stored in a plurality of sequential segments belonging to different profiles (e.g., having different combinations of aspect ratios, resolutions, frame rates, etc.), that are organized into playlists to support variable bit rates when transmitting the content as a stream to the consumer. In various aspects, the encryptor may encode content for delivery to the consumer from different playlists of the content item as network conditions change or consumer settings change. In various aspects, the content may be encrypted at various tiers in the CDN 100 and may be encrypted or decrypted multiple times to prevent unauthorized access to the content when cached by the CDN 100 or transmitted over the physical network. In various aspects, the broadcast QAM 222 is the same QAM used by the service provider to transmit linear and VOD content to consumers.

The LOD channels are built from linear channels and playlists that carry the desired LOD content items, and the consumer may set, via the request for desired LOD content items a maximum number of LOD channels to provide at any given timeslot. For example, when a consumer selects three LOD content items that are scheduled for broadcast during the same (or overlapping) timeslots, the number of LOD channels may be set to three, and will be adjusted automatically (upward and downward) as the number of selected LOD content items currently being broadcast changes. Alternatively, a request for LOD content items may include a maximum number of LOD channels that a consumer desires, and the number of LOD channels built for the consumer will not exceed that maximum desired number. As will be appreciated, if the number of desired LOD content items broadcast during a timeslot exceeds the maximum desired number of LOD channels, the number of LOD content items selectable for a given timeslot may be limited to the number of LOD channels or selections in excess of the maximum number of LOD channels may be ignored or override previous selections based on consumer preferences. As will also be appreciated, a service provider may set a maximum number of LOD channels that a consumer may request or that may be assigned automatically for a given timeslot.

LOD channels may be built according to consumer preferences so that a minimum number of LOD channels are built to provide the desired LOD content or to ensure that related LOD content is displayed in the same LOD channel. For example, a consumer who has set a maximum number of LOD channels to two, may designate the first LOD channel for sports broadcasts and the second LOD channel for other broadcasts (e.g., comedy, drama, a second sports broadcast during the broadcast of a first sports broadcast), and when the consumer selects a sports program as LOD, the first LOD channel will be built to include the channel carrying the selected sports program for the timeslot for which the broadcast is scheduled.

Figure 3A:
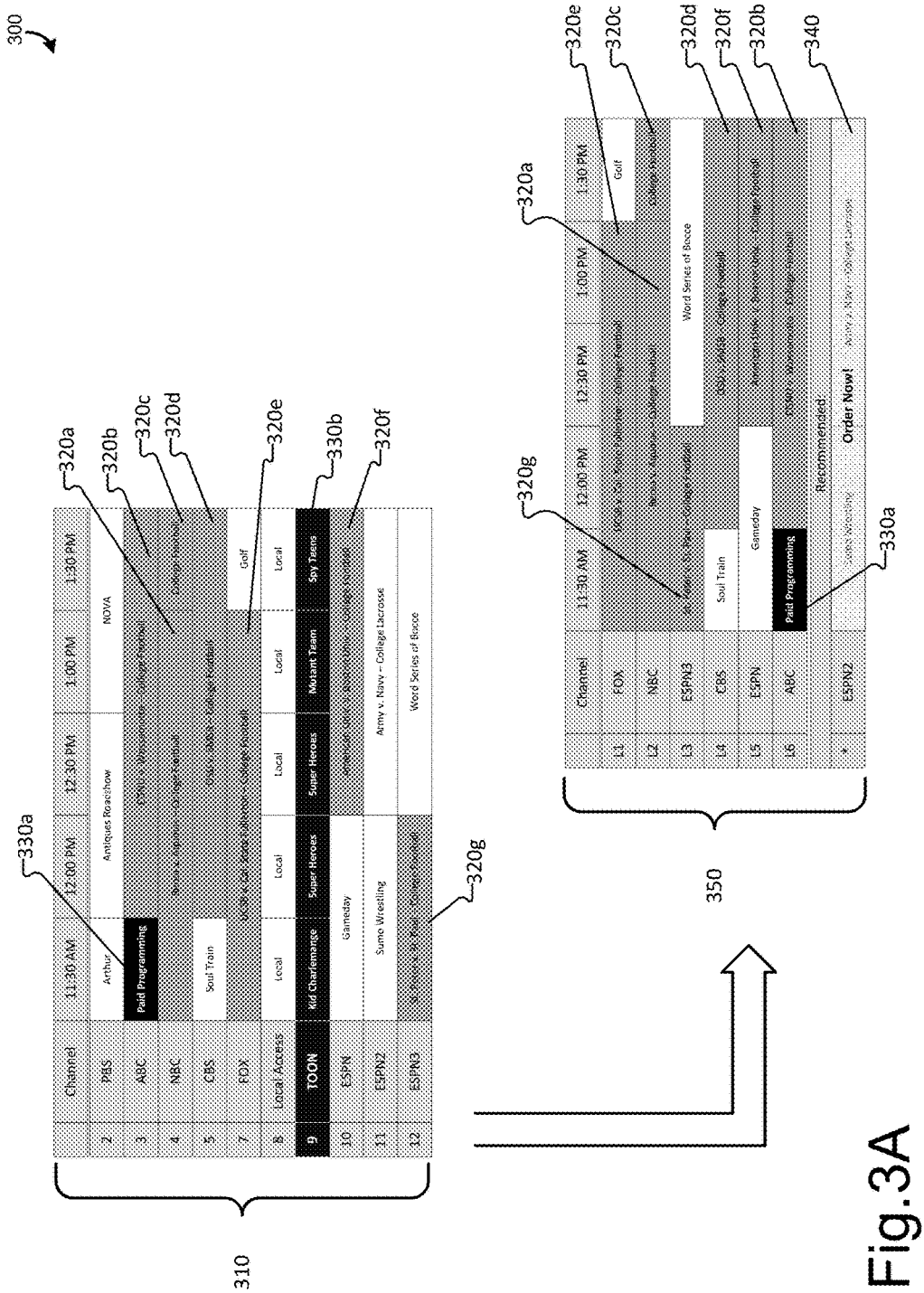
FIGS. 3A and 3B are block diagrams illustrating the refined delivery of LOD content from various linear content streams.
Figure 3B:
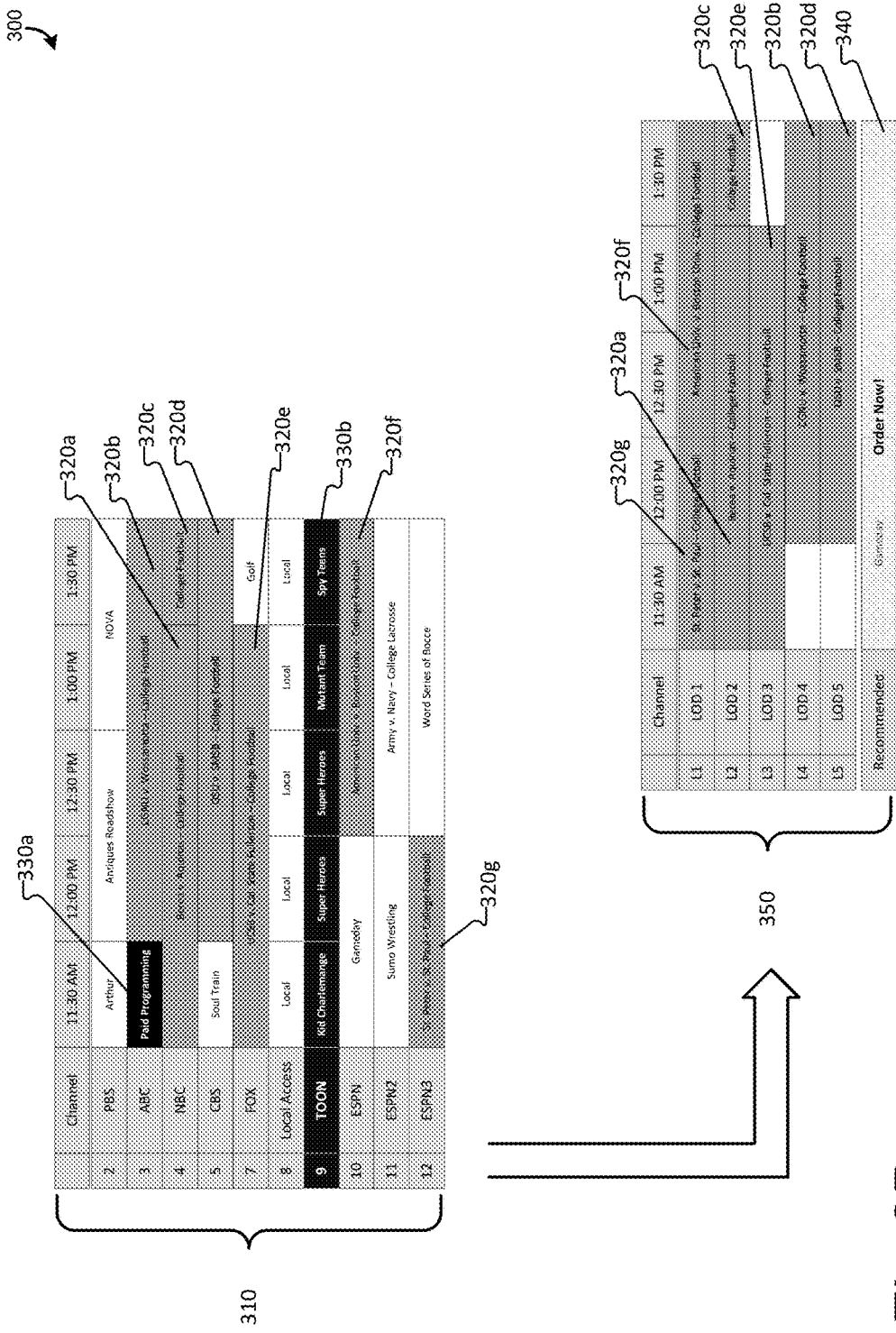

FIGS. 3A and 3B are block diagrams illustrating the refined delivery 300 of LOD content from various linear content streams. As illustrated, an initial program guide 310 shows the programming of several channels over a given period of time and an LOD program guide 350 shows the programming of several LOD channels over the same period of time according to various LOD indexes. LOD channels are virtual channels that are defined by the service provider and the consumer when delivering content as a personalized stream of IP packets encapsulating the content. By refining the number of channels used to deliver LOD content to a consumer, a service provider may improve the viewing experience of the consumer and reduce its computational load.

Standard linear content is assigned to a designated channel allocated to a television station 141. A television station 141 may refer to either an over-the-air broadcaster (terrestrial or satellite) or a cable network, as both are responsible for scheduling the linear content that will appear on their allocated channels. An initial program guide 310, such as those illustrated in FIGS. 3A and 3B, may be used as an interface for an LOD catalog 212, and in various aspects is organized according to an index corresponding to the ATSC allocation of channels. For example, the initial program guide 310 shows that channel two has been allocated to the Public Broadcasting Service (PBS) station, while channel three has been allocated to the American Broadcasting Company (ABC) station. Under ATSC, channel two corresponds to a carrier of 57 MHz and channel three corresponds to a carrier of 63 MHz. The content from PBS is encoded onto the 57 MHz carrier and the content from ABC is encoded onto the 63 MHz carrier, which are transmitted to the consumers.

As illustrated within the initial program guide 310, several linear content items are illustrated in their associated timeslots on their allocated channels. In the illustrated example, the selected broadcasts 320*a-g* (collectively, selected broadcasts 320) for several college football games are highlighted, while non-selected broadcasts are shown without highlighting. In various examples, the selected broadcasts 320 may be selected as part of a bundle for watching college football games provided in an LOD catalog 212, or a consumer may select each of the selected broadcasts 320 manually from an LOD catalog 212 or the initial program guide 310.

Also in the illustrated examples are several content items that have been blocked from being selected as LOD content. Individual content items or timeslots may be set as blocked programs 330*a* or channels may be set as blocked channels 330*b* (collectively, blocked broadcasts 330). Blocked broadcasts 330 may be set by a consumer, a service provider, or a television station 141 so that content from a blocked broadcast 330 cannot be selected as LOD content. This may be done for purposes of rights management, to encourage full subscriptions to cable services, or to block content based on its content rating (e.g., TV-Y, TV-MA, content including the "FV" descriptor, content including a strong language descriptor, rated G, unrated). In various aspects, blocked broadcasts 330 are shown in the LOD catalog 212 so that a consumer will know that the content is being broadcast, but is unavailable for selection as LOD content, although in other aspects, the blocked broadcast 330 is omitted from display in the LOD catalog 212.

Within an LOD program guide 350, the order in which selected broadcasts 320 are presented does not necessarily reflect the order in which they are presented in the initial program guide 310, but instead reflect an LOD index. For example, in an LOD program guide 350, content from ESPN and ESPN3 may be separated with content from CBS, instead of content from ESPN2 as it is in the initial program guide 310 using the ATSC index. In another example, content from ABC and NBC may be adjacent in the initial program guide 310 so that a consumer may navigate between the two via "channel up" and "channel down" commands without navigating through intervening channels, while the content is not adjacent in the LOD program guide 350. The order of the selected broadcasts 320 may be set by a consumer, and the selection may be saved for use as preferences for later requests for LOD content, or the order may be set by the service provider. In various aspects, the order of the selected broadcasts 320 in the LOD program guide 350, and how a consumer navigates between them, is controlled by an LOD index.

As illustrated, the LOD program guide 350 only includes the channels or content items that are selected broadcasts 320; channels or content items that are not available to the consumer are omitted from the LOD program guide 350. The selected broadcasts 320 may be selected individually by a consumer, or as part of a bundle that the service provider has assembled, and the selected broadcasts 320 are available for the consumer to view at the time that they are aired. In various aspects, the selected broadcasts 320, if cached by the service provider when aired, may be available for a period of time after the content has aired, such as, for example, when a consumer tunes in late to a program, the service provider may offer a cache of the program so that the consumer can view the beginning of the program, which was missed by the consumer.

In various aspects, the LOD program guide 350 may also include service provider selected content items or channels that are recommended broadcasts 340, which are related to selected broadcasts 320 but that have not been selected or made available to the consumer for viewing. A recommended broadcast 340 is presented in the LOD program guide 350, but the consumer cannot navigate to the recommended broadcast 340 until it is selected as a selected broadcast 320. For example, when a consumer has selected ESPN and ESPN3, but not ESPN2, as selected broadcasts 320, the schedule for ESPN2 may be presented in the LOD program guide 350 as recommended broadcasts 340 for the consumer to select. The presentation of a recommended broadcast 340 in the LOD program guide 350 may be distinguished from selected broadcasts 320 with a different color, a different size, a translucent overlay prompting the consumer to request the recommended broadcast 340 as a selected broadcast 320, a physical offset from the selected broadcasts 320 in the LOD program guide 350, a callout as a recommendation, and combinations thereof.

Recommended broadcasts 340 are determined to be related to selected broadcasts 320 based on metadata (including the current and historic selections made by other consumers, similar content titles, shared channel ownership, etc.) indicating that the content is similar to current and previously selected broadcasts 320 from the consumer. For example, a consumer who has selected ESPN and ESPN3 to watch football games may be recommended ESPN2, based on the prior selection of ESPN2 by the consumer, FoxSports, based on the current selection by other consumers in the consumer's service area who also selected ESPN and/or ESPN3, Disney Channel, based on the common ownership of ESPN and the Disney Channel, and Versus, based on a similar title of content being broadcast on Versus and content being broadcast on ESPN and/or ESPN3.

The LOD program guide 350 is provided to the consumer on an endpoint device 132 when the consumer calls for a program guide (e.g., changes channels, signals a "display program guide" command). In various aspects, guide data are transmitted to the network interface device 131 from the service provider so that the consumer may call for the program guide locally, while in other aspects guide data are held by a head-end 110 until a call from the consumer is received when it is encoded onto a separate channel or an overlay on the content of the currently viewed channel. The consumer may navigate forward and backward in time and up and down in channels on the LOD program guide 350. The channels are selectable by the consumer to rearrange the order in which selected broadcasts 320 are organized and thereby navigable by the consumer. The consumer may also navigate to selected broadcasts 320 via the LOD program guide 350 by selecting a currently airing selected broadcast 320 displayed in the LOD program guide 350. The consumer may also request additional broadcasts as selected broadcasts 320 by selecting a recommended broadcast 340 displayed in the LOD program guide 350 or by accessing the LOD catalog 212 again and making additional requests.

In FIG. 3A, the LOD program guide 350 is illustrated as being channel-defined. In an LOD program guide 350 that is channel-defined, channels over a selected period of time are provided to the consumer, including the selected broadcasts 320 as well as the other content encoded onto the channel. When a channel includes blocked broadcasts 330, the channel will temporarily not be provided (for the duration of the blocked broadcast 330), or the channel will temporarily not be unscrambled (for the duration of the blocked broadcast 330).

When the LOD program guide 350 is defined by channels, the service provider uses the carriers allocated to the channels to deliver the LOD content (no additional bandwidth is required for the delivery of LOD content) and the number of LOD channels available at a given time will be equal to the number of selected LOD content items being transmitted at that time. In various aspects, an interface device 131, such as, for example, an STB, is signaled by the service provider to reprogram how the channels are grouped and how navigation between the channels is to be accomplished. For example, when channel seven is to be the first LOD channel in the block and channel four the second, the "channel up" command when tuned to channel seven will be reprogrammed on the interface device 131 to move down by three channels, while the "channel down" command when tuned to channel four will be reprogrammed on the interface device 131 to move up by three channels. Numeric navigation may also be reprogrammed so that if broadcast channel twelve is assigned to LOD channel three, a consumer entering the command to "navigate to channel three" will navigate to LOD channel three instead of broadcast channel three.

In FIG. 3B, the LOD program guide 350 is illustrated as being program-defined. In an LOD program guide 350 that is program-defined, selected broadcasts 320 are provided to the consumer on a channel that does not necessarily correspond to a channel assigned to a television station 141. For example, a single LOD channel is built from the linear channels carrying selected broadcast 320f and selected broadcast 320g despite those selected broadcasts 320 being presented on different channels as linear content. In some aspects, the single LOD channel is an Over-the-Top (OTT) channel using a stream of Internet Protocol packets that carry the selected broadcasts 320 as their payload. In other aspects, the single LOD channel may be the one or more cable television channels allocated to carry the programs that the interface device 131 switches between at the time of program changeover (e.g., at the end of a timeslot), thus requiring no additional bandwidth to deliver requested LOD content.

Additionally, in a program-defined LOD program guide 350, the number of channels that are provided to the consumer will vary as selected broadcasts 320 start and finish. In the illustrated example, only three selected broadcasts 320 (320a, 320e, and 320g) occur during the 11:30 AM time block and only three LOD channels need to be provided to the consumer, while during the 12:30 AM time block, five channels are provided to the consumer to deliver the five selected broadcasts 320a-g that occur during that time block, and two additional channels will be added to the block of channels provided to the consumer. Similarly, when an LOD channel no longer carries selected broadcasts 320, that LOD channel may be dropped from the channels provided to the consumer. The LOD index is continually updated as timeslots or programs end so that the order in which the consumer navigates the remaining LOD channels will skip any dropped LOD channels and added LOD channels will be part of the continuously navigable block of channels managed by the LOD index. For example, when LOD channel three is dropped from the provided LOD channels 1-5, a consumer navigating the channels via "channel up" commands would navigate from channel two to channel four (and vice versa with "channel down" commands); skipping LOD channel three. When a fifth concurrent selected broadcast 320 is again part of the LOD program guide 350, it may be carried on LOD channel three, and either reinserted between LOD channels two and five or treated like new LOD channel six.

As will be appreciated, even though linear content is originally scheduled to avoid timing conflicts on a given channel, a distinction exists between when one selected broadcast 320 begins and the other ends because live linear content may overrun its original timeslots (e.g., during overtime for a sporting event). Consumers, therefore, may set preferences as to which LOD content item on a given channel is to take priority in the event of an overrun. In some aspects, the service provider may provide additional LOD channels to carry overrun LOD content, so that the consumer still has access to the lower priority content, albeit on a different LOD channel. The service provider may prompt the consumer to select, or use consumer preferences or internal policies to automatically select, which content item remains on the originally assigned LOD channel number (to which the consumer is tuned) and which content item or items are moved to the additional LOD channels. When the overrunning LOD content item concludes, the service provider may cease providing the LOD channel carrying the overrunning LOD content when the consumer is not tuned to that channel or cease providing the additional LOD channel when the consumer is not tuned to the additional LOD channel, encoding any content items that were provided on the additional LOD channel on the original LOD channel.

As will also be appreciated, when LOD content overruns its timeslot, the service provider may extend the consumer's access from the originally scheduled time. For example, when a consumer has requested a baseball game scheduled to conclude at 10:00 PM (or requested the channel carrying that baseball game for its scheduled duration), the service provider may extend the consumer's access to the baseball game or the channel in the event that the game goes into extra innings. When the overrun does not affect the consumer's continued access to the LOD content item, the service provider may decline to extend the consumer's access. For example, if the consumer were to request a channel carrying a baseball game schedule to end at 10:00 PM for the time period of 7:00 PM until 11:00 PM, the service provider may decline to extend the consumer's access to the channel unless the baseball game's overrun goes past 11:00 PM.

Figure 4:
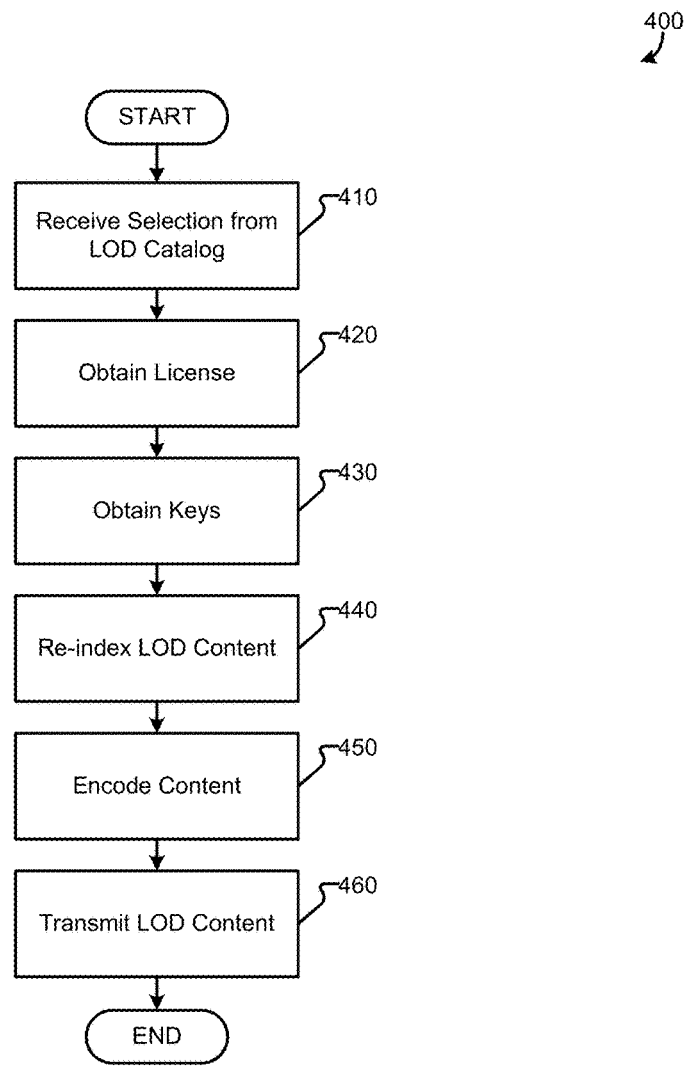
FIG. 4 is a flowchart illustrating general stages in an example method for a service provider to provide LOD content to consumers.

FIG. 4 is a flowchart illustrating general stages in an example method 400 for a service provider to provide LOD content to consumers. Method 400 begins when the service provider receives a selection from an LOD catalog 212 from a consumer at OPERATION 410. The service provider analyzes the selection to determine what LOD content has been selected, and proceeds to OPERATION 420, where a license is obtained for the requested LOD content. In various aspects, obtaining a license entails consulting a license server 250 to determine the cost of obtaining the license, and billing an account associated with the consumer for said license. In other aspects, obtaining a license entails determining whether the requested LOD content is available to the consumer. For example, the consumer may be in a black-out zone for a sports broadcast that would otherwise be available for selection as LOD content, rendering the LOD content unavailable to the consumer. In another example, a rights holder may allow access to LOD content on a television, but not a mobile device, and the availability of a license may vary based on the device used to request the LOD content. When a license cannot be obtained, the service provider may transmit a message to the consumer to alert the consumer that the LOD content will not be delivered as requested, and method 400 concludes.

When a license is obtained, method 400 proceeds to OPERATION 430, where cryptographic keys associated with the license for scrambling and descrambling the LOD content are obtained. LOD content may be encrypted via various ciphers to prevent unauthorized access of the LOD content, and the keys are used to scramble or descramble the LOD content via the cipher. As will be understood, different ciphers (e.g., digital video broadcasting common scrambling algorithm (DVB-CSA), PowerVu, Nagravision) require different numbers of keys (also known as control words) and the keys may be periodically changed (e.g., every minute, half-hourly, hourly, daily). Keys may be public or private, and the consumers receive the keys to descramble the content via entitlement management messages (EMM) that are periodically sent to the consumer. Depending on the number of content items that the consumer has been given access to, the number of keys included in an EMM will vary. For example, to unscramble three linear channels during one timeslot, the consumer may receive three keys operable for that timeslot; one associated with the license for each channel. A service provider, when offering a bundle, may transmit one key that corresponds to multiple channels, such as, for example, when channels 1-8 are bundled together, one key can be used to unscramble each of channels 1-8. Additionally, an EMM may include several keys for an individual channel or bundle, for example, the 11:30 AM, 12:00 PM, and 12:30 PM half-hourly keys for channel three may be included in one EMM.

In various aspects, the service provider obtains all the keys needed for a given consumer's requested content items or channels and transmits the keys to the consumer when (or before) the requested content begins airing. In other aspects, the service provider obtains the keys for the requested content items or channels for one block of time and transmits the keys to the consumer when the key is needed to unscramble content broadcast during that block of time. The consumer, via a memory storage device associated with an interface device 131 or endpoint device 132, will store the keys and apply them during the appropriate block of time to the incoming linear content. When a consumer's requested programs or timeslots have ended, the service provider may simply cease sending new keys to the consumer, as the previously sent keys will not be effective for descrambling the content broadcast by the service provider. As will be appreciated, changing the keys more frequently will enable the service provider greater control of the consumer's access to content, and by matching the key changing cycle to the broadcast cycle of half-hour long program blocks, or by evenly divisible segments thereof (e.g., 10 minutes, 5 minutes, 3.75 minutes), the service provider may sync the consumer's access to content with the broadcast schedule for the content.

At OPTIONAL OPERATION 440 the LOD content is re-indexed. By re-indexing the LOD content, it can be organized as an unbroken block for the consumer to navigate. For example, if a consumer selected only content from evenly numbered channels, the channels could be re-indexed so that the oddly numbered channels are dropped from navigation (e.g., a consumer viewing channel four and navigating with "channel up" and "channel down" commands would navigation to channel six or channel two instead of channel five or channel three respectively). In various aspects, organization of the block may be set by the service provider or according to preferences set by the consumer.

The re-indexing is transmitted to the consumer and stored, via a memory device associated with an interface device 131 or endpoint device 132, so that it is applied to the content transmitted via the CDN 100. The consumer will have access to the LOD program guide 350 and may navigate it to request LOD content and how it is to be arranged.

Content delivered over the physical network via IPTV standards is re-indexed at a local node 120 or head-end 110 so that when a consumer requests a content item, the request is sent to the local node 120 or head-end 110 to encapsulate the requested content in a stream of IP packets that are destined for the requesting consumer. As will be understood, when a consumer changes channels under IPTV, a request is sent to the local node 120 or head-end 110 to encapsulate the content of the newly requested channel in a stream of packets that are delivered to the consumer. Each consumer will receive a constant stream of IP packets carrying requested content as their payloads, and the service provider will vary the content of those packets depending on the channel request last communicated to the service provider by each consumer.

As will be appreciated, when the consumer already has access to an existing block of content or channels (e.g., has made a previous request for LOD content, is adding LOD content to a subscription), OPERATION 440 may be omitted. For example, when a consumer has a subscription that leaves certain channels as navigable, albeit scrambled or blank (optionally with the channel metadata displayed to entice the consumer to order the channel) so that their content is not accessible by the consumer, and the consumer requests the content of those channels as LOD content, the content of those channels may be provided to the consumer without having the channels re-indexed. In another example, when the consumer has a subscription to channels 2-50, and requests channels fifty-three, seventy-six, and ninety-one as LOD content, the requested channels may be re-indexed as channels fifty-one, fifty-two, and fifty-three, respectively to provide an unbroken block of content. Alternatively, the channels may be partially re-indexed, such that they retain their channel numbers for "tune to" commands, but are treated as consecutive channels for "channel up" and "channel down" commands; skipping any intervening channels.

Method 400 then proceeds to OPERATION 450 where the linear content is encoded for transmission. In aspects using IPTV, LOD content is encapsulated in an IP packet and is encoded onto the carriers having frequencies/wavelengths associated with the consumer when the consumer has been granted access to the LOD content. When the consumer loses access to the LOD content (e.g., at the end of a requested timeslot), the service provider may cease encapsulating LOD content and instead encapsulate content that the consumer does have access to, a blank screen, random data (e.g., "snow"), metadata related to that channel or its associated content item, or a menu interface for the LOD catalog 212. In addition to encoding the content for transmission, the content may also be encrypted at various tiers of the CDN 100 to prevent unauthorized access which cached or during transmission.

At OPERATION 460 the service provider transmits the LOD content to the consumer via the CDN 100. Method 400 then concludes.

Figure 5:
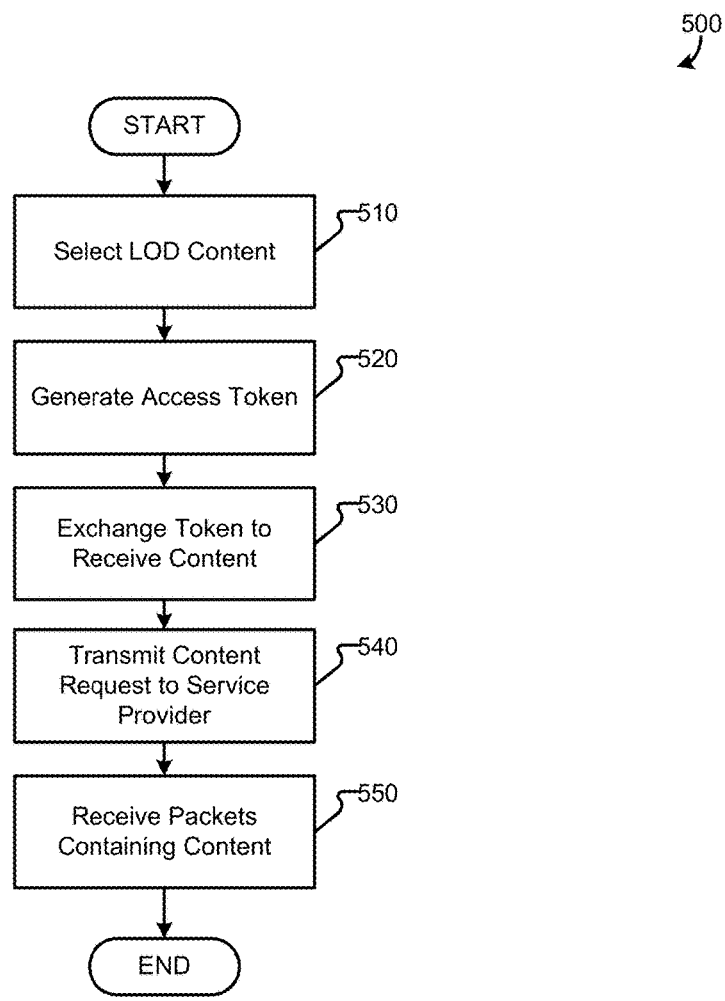
FIG. 5 is a flowchart illustrating general stages in an example method for a consumer to receive LOD content from a service provider.

FIG. 5 is a flowchart illustrating general stages in an example method 500 for a consumer to receive LOD content from a service provider. Method 500 beings when a consumer selects LOD content in operation 510. In various aspects, the consumer selects LOD content from an LOD catalog 212 provided in an interface menu or from an electronic program guide for all of the service provider's offerings. In various aspects, a new index is created for the LOD content at the time of selection so that the requested LOD content can be presented as a continuous block to the consumer.

Method 500 then proceeds to OPERATION 520, where an access token is generated for the consumer. Once an LOD offer manager 220 receives the consumer's selection of LOD continent, it will communicate with the various preferences servers 230 and license servers 250 to grant the consumer a license to view the selected LOD content. In some aspects, granting a license involves charging an account associated with the consumer with the appropriate license fees for the requested content. The access token is generated at the time that the licenses are granted, and may be stored locally to the consumer (e.g., by a memory storage device associated with an interface device 131 or an endpoint device 132) or remotely from the consumer (e.g., by the service provider). The access token may be generated in advance of the requested delivery of LOD content and may include preferences for how the LOD content is to be arranged for consumption (e.g., a channel order, LOD channel assignment for linear channels, overrun options). Consumers may also set recurring access tokens, for example, a consumer may set a recurring token for requesting the airing programs from HBO every Sunday from 5:00 PM until 12:00 AM, which results in a new access token being generated each week.

At OPERATION 530 the access token is exchanged to receive the requested LOD content. When the access token is stored locally to the consumer, it is transmitted to the service provider to indicate that the consumer has the proper licenses to receive the requested LOD content. In some aspects, when the access token is stored remotely from the consumer, the service provider automatically exchanges the access token and begins providing the consumer with access to the requested content. In other aspects, the service provider may wait to receive a signal from the consumer before exchanging the access token. An access token that is not exchanged may have its license fees refunded or applied to another timeslot.

Method 500 then proceeds to OPERATION 540, where the consumer transmits a content request to the service provider. The service provider may process, at a head-end 110 or at a local node 120, the request for content, which may be a signal that the consumer has requested a change in channel or has turned on an endpoint device 132. The frequency/wavelength used to carry the requested content to the head-end 110 or local node 120 is then tuned to by the head-end 110 or local node 120, and the content is re-packaged as a stream of IP packets and encoded on a carrier having a frequency/wavelength associated with the consumer. In various aspects, the content may be scrambled when re-packaged and the IP packets (or their payloads) may be encrypted to prevent unauthorized consumption of the content.

At OPERATION 550 the consumer receives the IP packets carrying the request LOD content as their payload. The IP packets are received in a stream on a frequency or wavelength dedicated to the consumer. In various aspects, an interface device 131 or endpoint device 132 associated with the consumer unscrambles or decrypts the payload (if scrambling or encryption is used by the service provider), and the content stream is provided to the consumer. Method 500 then concludes.

Figure 6:
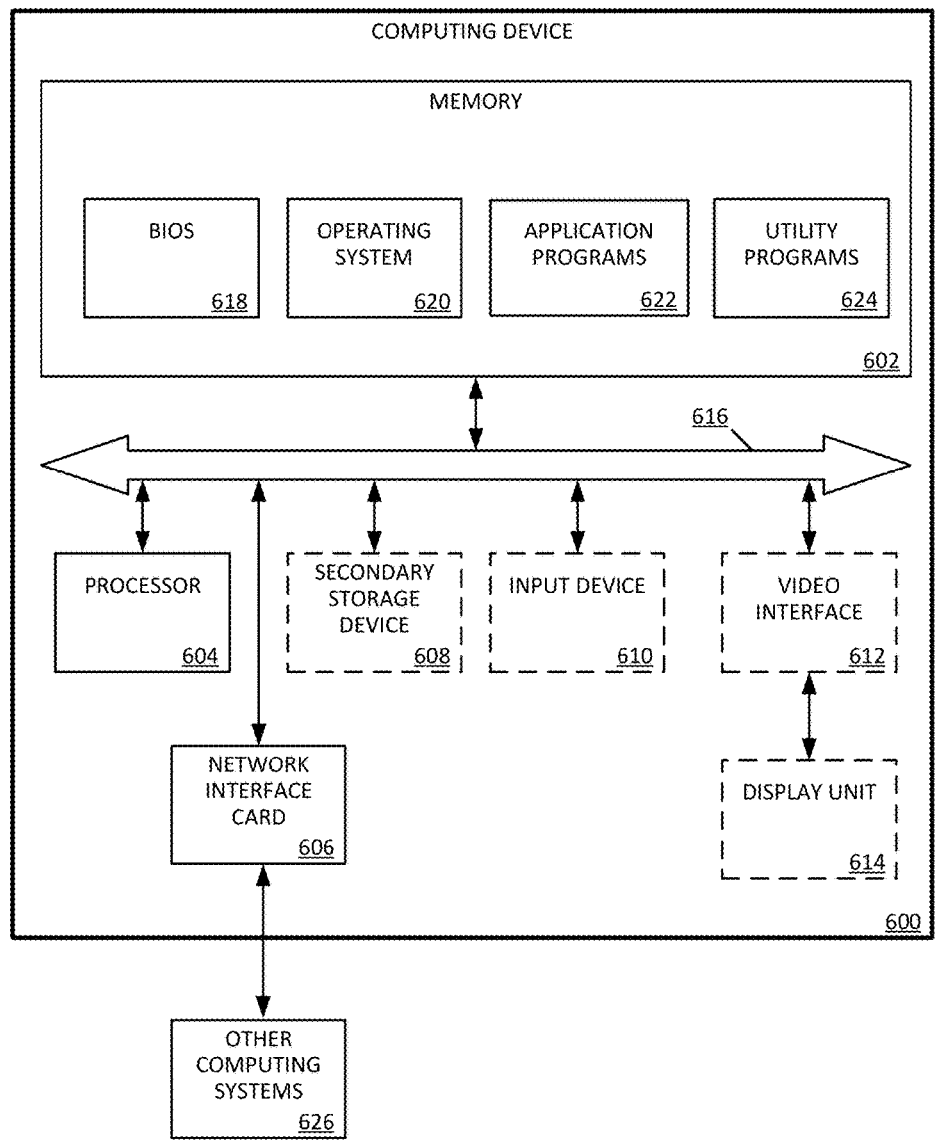
FIG. 6 is a block diagram illustrating example physical components of a computing device with which embodiments of the present disclosure may be practiced.

FIG. 6 is a block diagram illustrating example physical components of a computing device 600 with which embodiments of the present disclosure may be practiced. In some embodiments, one or more of the components of the LOD system 200 are implemented using one or more computing devices like the computing device 600. It should be appreciated that in other embodiments, one or more of the components of the LOD system 200 may be implemented using computing devices having hardware components other than those illustrated in the example of FIG. 6.

Computing devices may be implemented in different ways in different embodiments. For instance, in the example of FIG. 6, the computing device includes a memory 602, a processor 604, a network interface 606, an optional secondary storage device 608, an input device 610, a video interface 612, communicated with a display unit 614, and a communications medium 616. In other embodiments, the computing device 600 may be implemented using more or fewer hardware components or in combination with other types of computer systems and program modules.

The memory 602 includes one or more computer-readable storage media capable of storing data or computer-executable instructions that, when executed by processor 604, provide functionalities as described herein. In various embodiments, the memory 602 is implemented in various ways. For example, the memory 602 can be implemented as various types of computer-readable storage media to store various types of data or software instructions. For instance, in the example of FIG. 6, the memory 602 stores a Basic Input/Output System (BIOS) 618 and an operating system 620. The BIOS 618 includes a set of software instructions that, when executed by the processor 604, cause the computing device 600 to boot up. The operating system 620 includes a set of software instructions that, when executed by the processor 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processor 604, cause the computing device 600 to provide utilities to other software programs.

The optional secondary storage device 608 includes one or more computer-readable storage media, and may store data and computer-executable instructions not directly accessible by the processor 604. That is, the processor 604 performs an I/O operation to retrieve data or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid-state memory devices, or other types of computer-readable storage media.

The processor 604 includes one or more processing units, which may include tangible integrated circuits that selectively execute computer-executable instructions. In various embodiments, the processing units in the processor 604 are implemented in various ways. For example, the processing units can be implemented as one or more processing cores. In another example, the processor 604 can comprise one or more separate microprocessors. In yet another example, the processor 604 can comprise Application-Specific Integrated Circuits (ASICs) that provide specific functionality. In yet another example, the processor 604 provides specific functionality by using an ASIC and by executing computer-executable instructions.

The computing device 600 may be enabled to send data to, and receive data from, a communication network via a network interface 606. In different embodiments, the network interface 606 is implemented in different ways, such as an Ethernet interface, a token-ring network interface, a fiber optic network interface, a wireless network interface (e.g., Wi-Fi, Wi-Max, etc.), or another type of network interface. The network interface 606 enables the computing device 600 to communicate with other computing systems 626, such as over a wireless network in a distributed computing environment, a satellite link, a cellular link, and comparable mechanisms. Other devices may include computer device(s) 600 that execute communication applications, storage servers, and comparable devices.

The optional input device 610 enables the computing device 600 to receive input from a user. Example types of input devices 610 include, but are not limited to: keyboards, mice, trackballs, stylus input devices, keypads, microphones, joysticks, touch-sensitive display screens, and other types of devices that provide user input to the computing device 600.

The optional video interface 612 outputs video information to an optional display unit 614. In different embodiments, the video interface 612 is implemented in different ways. For example, the video interface 612 may be a video expansion card. In another example, the video interface 612 is integrated into a motherboard of the computing device 600. In various aspects, the display unit 614 can be an LCD display panel, a touch-sensitive display panel, an LED screen, a projector, a cathode-ray tube display, or another type of visual display device. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processor 604, the network interface 606, the secondary storage device 608, the input device 610, and the video interface 612. In different embodiments, the communications medium 616 is implemented in different ways, such as a PCI bus, a PCI Express bus, an accelerated graphics port (AGP) bus, an InfiniBand interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

Embodiments of the present disclosure may be used in various distributed computing environments where tasks are performed by remote processing devices that are linked through a communications network in a distributed computing environment.

Examples and aspects are described above with reference to block diagrams or operational illustrations of methods, systems, and devices. The functions/acts noted in the blocks may occur out of the order as shown in any flowchart or described herein with reference to FIGS. 4 and 5. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated. For example, the functionality of transceivers may be implemented as discrete receivers and transmitters.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A system for providing linear on demand (LOD) content over a hybrid fiber-coaxial (HFC) network to a consumer, the system comprising:
   at least one processor and at least one memory storage device that includes instructions, which when executed by the at least one processor provide:
   an LOD client operable to enable the consumer to make a request for desired LOD content items, the request including a maximum desired number of LOD channels on which to receive the desired LOD content items; and
   an LOD offer manager in communication with the LOD client via the HFC network, wherein the LOD offer manager is operable, in response to receiving the request, to:
      build, from an initial program guide, an LOD program guide that includes LOD channels derived from linear channels of the initial program guide on which the desired LOD content items are broadcast, wherein a number of LOD channels is no more than the maximum desired number of LOD channels;
      generate an LOD index corresponding with the LOD program guide, wherein the LOD index organizes the LOD channels into a continuously navigable block; and
      transmit the LOD index to the LOD client to enable the consumer to navigate the LOD channels as the continuously navigable block.

2. The system of claim 1, wherein the request for desired LOD content items is made for a content bundle to enable the consumer to select multiple LOD content items as the desired LOD content items via a single request.

3. The system of claim 1, wherein the LOD offer manager includes a re-packager, wherein the re-packager is operable to:
   in response to receiving a navigation command from the consumer indicating a given LOD channel, encode an LOD content item currently scheduled for broadcast via the given LOD channel onto a wavelength assigned to the consumer by a service provider.

4. The system of claim 1, wherein the LOD offer manager is further operable to:
   cryptographically scramble the linear channels according to keys associated with each linear channel; and
   transmit, to the LOD client, the associated key for each linear channel that comprises the LOD channels to enable the LOD client to cryptographically descramble the desired LOD content items.

5. The system of claim 4, wherein the keys associated with each linear channel that comprises the LOD channels are updated at least every thirty minutes and re-transmitted to the LOD client.

6. The system of claim 1, wherein the LOD offer manager is further operable to:
   obtain, for the consumer, licenses for the desired LOD content items that set terms of access to the desired LOD content items so that when the desired LOD content items are broadcast on the linear channels, the consumer will be granted access to view the desired LOD content items.

7. The system of claim 1, further comprising a preferences server to store consumer preferences for how the LOD index organizes the desired LOD content items.

8. The system of claim 1, wherein the LOD client is further operable to provide, in response to a call from the consumer, the LOD program guide based on the LOD index to include unlocked channels provided in an unbroken block absent blacked out channels provisioned between the unlocked channels.

9. The system of claim 8, wherein the LOD program guide includes recommended programs based on previous requests from the consumer for LOD content items and similar LOD content items to the desired LOD content items as determined by a service provider.

10. The system of claim 1, wherein to build the LOD channels further comprises:
    assign a first linear channel carrying a first desired LOD content item broadcast during a first timeslot to a first LOD channel; and
    assign a second linear channel carrying a second desired LOD content item broadcast during a second timeslot to the first LOD channel, wherein the second timeslot begins when the first timeslot ends.

11. A method for providing linear on demand (LOD) content over a hybrid fiber-coaxial (HFC) network to a consumer, comprising:

receiving, from a consumer, a selection of desired LOD content items from an LOD catalog, wherein the LOD catalog includes the LOD content items selectable by the consumer;

building, from an initial program guide, an LOD program guide that includes LOD channels derived from linear channels of the initial program guide that carry the desired LOD content items, wherein a number of the LOD channels during a timeslot is equal to a number of desired content items scheduled for broadcast during the timeslot, and the number of LOD channels is adjusted when the timeslot ends to provide a minimum number of LOD channels needed to carry the desired LOD content items;

generating an LOD index corresponding with the LOD program guide to organize navigation between the LOD channels as a continuously navigable block of LOD channels; and transmitting to the consumer, via the HFC network, the LOD index.

12. The method of claim 11, wherein the LOD index is operable to change how a network interface device orders linear channels carrying desired LOD content items such that linear channels not carrying desired LOD content items during a given timeslot are not part of the continuously navigable block of LOD channels, and are non-navigable by the consumer, during the given timeslot.

13. The method of claim 11, further comprising:
obtaining a license for the desired LOD content items indicated by the selection, wherein the license provides keys needed to decrypt the linear channels carrying the desired LOD content items during the timeslot; and
transmitting the keys to the consumer to enable the consumer to decrypt the linear channels during the timeslot for the desired LOD content items.

14. The method of claim 11, further comprising, generating the LOD program guide for display on an endpoint device, wherein the LOD program guide is based on the LOD index to display which LOD channels the desired LOD content items are scheduled to be displayed on and when the desired LOD content items are scheduled to be broadcast.

15. The method of claim 14, wherein the LOD program guide includes a recommendation for a currently broadcasting linear content item that is selectable by the consumer as an additional LOD content item.

16. The method of claim 11, wherein the continuously navigable block of LOD channels is navigable separately from other linear channels to which the consumer is subscribed.

17. A system for re-indexing cable television channels to provide linear on demand (LOD) content over a hybrid fiber-coaxial (HFC) network to a consumer, the system comprising:
a processor and a memory storage device including instructions, which when executed by the processor are operable to:
receive, from a consumer, a selection of LOD content items from an LOD catalog, wherein the LOD catalog includes the LOD content items selectable by the consumer, wherein the selection sets a maximum number of LOD channels;
obtain a license for the LOD content items selected by the consumer;
when the license is obtained for the selected LOD content items, build an LOD program guide that includes LOD channels derived from linear channels of an initial program guide, and generate an LOD index corresponding with the LOD program guide to re-index the linear channels on which the selected LOD content items are scheduled to air into the LOD channels that are navigable as a continuous block via channel up and channel down commands made by the consumer, wherein a number of LOD channels into which the linear channels are re-indexed during a given timeslot is equal to the maximum number of LOD channels; and
transmit the selected LOD content items to the consumer via the HFC network at a time that the selected LOD content items are scheduled to air by multiplexing the selected LOD content items onto fiber optic cables.

18. The system of claim 17, wherein the system is further operable to transmit program guide data via the HFC network to a network interface device, wherein the program guide data are organized based on the LOD index, and enable the consumer to request the LOD program guide organized to display when the selected LOD content items are scheduled to air.

19. The system of claim 17, wherein the system is further operable to:
scramble the selected LOD content items according to keys before the selected LOD content items are transmitted to the consumer;
obtain the keys for the selected LOD content items for the consumer to unscramble the selected LOD content items; and
transmit the keys, via the HFC network, to the consumer before the selected LOD content items are transmitted to the consumer.

20. The system of claim 19, wherein the keys to scramble the selected LOD content items are changed at least every thirty minutes.

* * * * *